United States Patent
Suga

(10) Patent No.: US 7,890,660 B2
(45) Date of Patent: Feb. 15, 2011

(54) DATA PROCESSING SYSTEM, DATA PROCESSING APPARATUS AND SERVER APPARATUS

(75) Inventor: Satoshi Suga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 362 days.

(21) Appl. No.: 12/113,444

(22) Filed: May 1, 2008

(65) Prior Publication Data

US 2008/0307113 A1 Dec. 11, 2008

(30) Foreign Application Priority Data

Jun. 5, 2007 (JP) .............................. 2007-149545

(51) Int. Cl.
*G06F 13/00* (2006.01)
(52) U.S. Cl. ...................................... 709/246; 709/203
(58) Field of Classification Search ................ 709/203, 709/217–219, 246; 718/100
See application file for complete search history.

(56) References Cited

U.S. PATENT DOCUMENTS

2004/0068553 A1 * 4/2004 Davis et al. ................. 709/218

FOREIGN PATENT DOCUMENTS

JP 2005-323351 11/2005

* cited by examiner

*Primary Examiner*—Kenneth R Coulter
(74) *Attorney, Agent, or Firm*—Oblon, Spivak, McClelland, Maier & Neustadt, L.L.P.

(57) ABSTRACT

A data processing system having a client apparatus for requesting target data to be processed and a server apparatus for performing a process on the target data transmitted from the client apparatus is disclosed that includes a client process request transmitting part provided in the client apparatus and configured to transmit a process request and processible data indicating data that can be processed by the client apparatus to the server apparatus, and a processing part provided in the server apparatus and configured to perform a suitable process on the target data based on the processible data transmitted together with the process request from the client process request transmitting part.

9 Claims, 14 Drawing Sheets

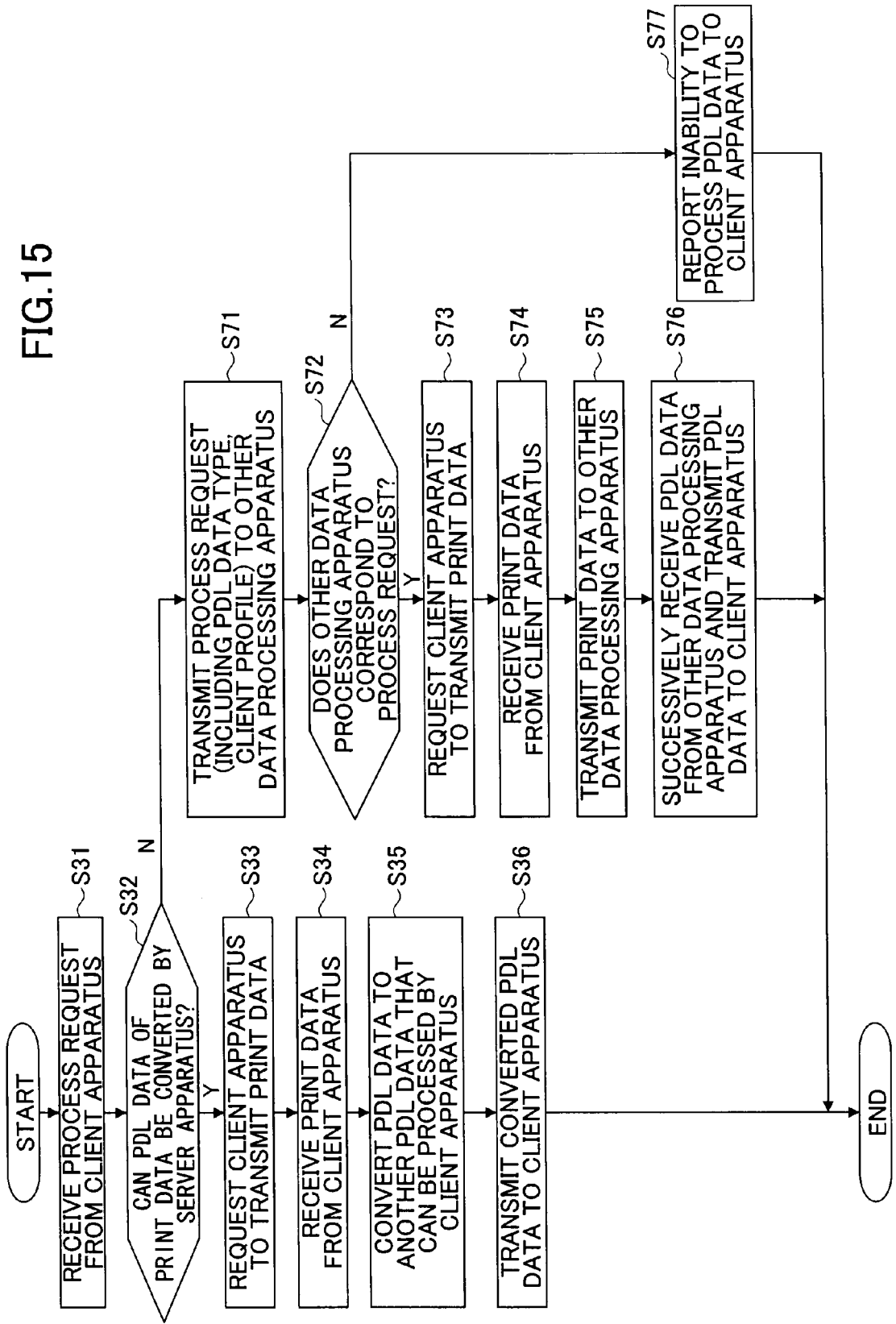

DATA PROCESSING SYSTEM, DATA PROCESSING APPARATUS AND SERVER APPARATUS

BACKGROUND OF THE INVENTION

1. Field of the Invention

The present invention relates to a data processing system, a server apparatus, and a data processing apparatus such as a reading apparatus (e.g., scanner) or a printing apparatus (e.g., a digital multifunction machine, a digital copier, a facsimile machine, a printer).

2. Description of the Related Art

Conventionally, a large size computer (e.g., main frame) is used in a case of processing data of a large size (workload). However, in recent years and continuing, since personal computers are becoming faster and more personal computers and workstations are being used by connecting to a data processing system via a network (e.g., LAN (Local Area Network)), more data processing systems are being used as replacements for the large size computers. For example, Japanese Laid-Open Patent Application No. 2005-323351, proposes a data processing system for performing high speed printing, in which a server(s) distributes printing jobs (printing requests) to an optimum printer among a group of printers.

However, the data processing system described in Japanese Laid-Open Patent Application No. 2005-323351 includes printers which all have the same functions and a server(s) having a part of the same functions. Furthermore, due to advances of printers which are constantly being produced with new functions in cycles of less than a year as well as changes in the role of printers, printers are replaced by new printers as they get older. Therefore, a data processing system usually consists of a group of various data processing apparatuses having different functions.

SUMMARY OF THE INVENTION

The present invention may provide a data processing system, a data processing apparatus, and a server apparatus that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing system, a data processing apparatus, and a server apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing system having a client apparatus for requesting target data to be processed and a server apparatus for performing a process on the target data transmitted from the client apparatus, the data processing system including: a client process request transmitting part provided in the client apparatus and configured to transmit a process request and processible data indicating data that can be processed by the client apparatus to the server apparatus; and a processing part provided in the server apparatus and configured to perform a suitable process on the target data based on the processible data transmitted together with the process request from the client process request transmitting part.

Furthermore, another embodiment of the present invention provides a data processing apparatus for processing target data, the data processing apparatus including: a processing part configured to perform a suitable process on the target data when receiving data that can be processed by a client apparatus.

Furthermore, another embodiment of the present invention provides a server apparatus connectable to a plurality of the data processing apparatuses according to the embodiment of the present invention, the server apparatus including: a data storing part configured to store data of the processing part of each of the plural data processing apparatuses; and a data displaying part configured to display the data of the processing part of each of the plural data processing apparatuses to the client apparatus according to the embodiment of the present invention.

Other objects, features and advantages of the present invention will become more apparent from the following detailed description when read in conjunction with the accompanying drawings.

BRIEF DESCRIPTION OF THE DRAWINGS

FIG. 15 is a flowchart showing a second example of operation controls performed in a case where a server apparatus in a data processing system shown in FIG. 2 receives a process request from a client apparatus in a network according to an embodiment of the present invention.

DETAILED DESCRIPTION OF THE PREFERRED EMBODIMENTS

First, embodiments of the present invention are described with reference to FIGS. 1-3.

[Network Configuration of Data Processing System 1000 According to a First Embodiment of the Present Invention]

Figure 1:
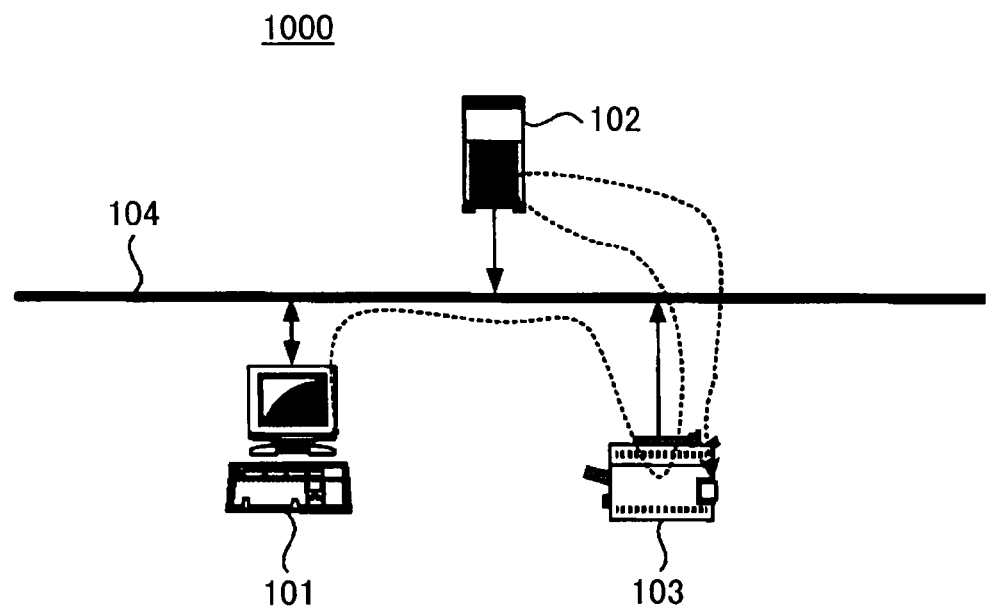
FIG. 1 is a schematic diagram showing a network configuration of a data processing system according to a first embodiment of the present invention.

FIG. 1 is a schematic diagram showing the network configuration of the data processing system 1000 according to the first embodiment of the present invention.

The data processing system 1000 includes, for example, a computer (e.g., personal computer) 101, a server apparatus 102, and a data processing apparatus (in this example, a printer apparatus) 103 which are connected via a network (e.g., LAN (Local Area Network) 104. For example, the connection of the network 104 may be established by serial connection based on a RS-485 standard or by parallel connection based on a SCSI (Small Computer System Interface). The method of connection also applies to the below-described data processing systems according to the second and third embodiments of the present invention.

The computer 101, in accordance with the controls of the user (e.g., an inputting operation performed on an input apparatus by the user), uses an application program (hereinafter also referred to as "application") to generate a printing request (also referred to as "printing job") and transmit the generated printing request to the printer apparatus 103. The printing request is a process request for requesting printing data to be processed.

The printer apparatus 103 is a printing apparatus which receives the printing request from the computer 101 and conducts a printing process. That is, the printer apparatus 103 prints (image formation) image data based on the printing request onto a recording medium (e.g., paper), so that the image data can be made into a visible image. In this case, the printer apparatus 103 may transmit a part of the printing request as a process request to the server apparatus 102 and receive a process result corresponding to the process request from the server apparatus 102.

The server apparatus 102 receives the process request from the printer apparatus 103 and conducts a process according to the received process request. Then, the server apparatus 102 transmits the result of the process (process result) to the printer apparatus 103.

It is to be noted that the broken lines shown in FIG. 1 the overall flow of control in a case where a printing process is requested from the computer 101 to the printer apparatus 103 according to an input operation by the user (user operation).

[Network Configuration of Data Processing System 2000 According to a Second Embodiment of the Present Invention]

Figure 2:
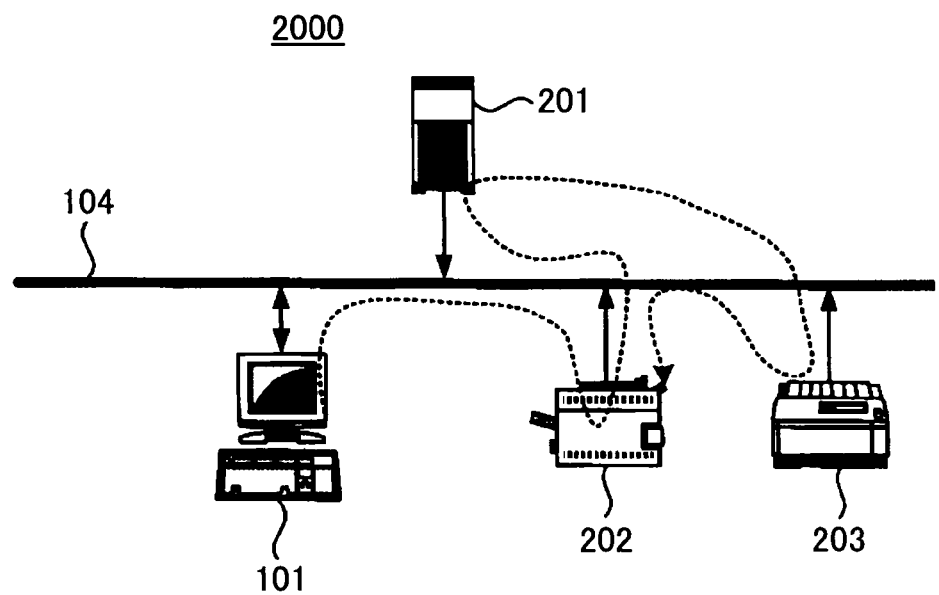
FIG. 2 is a schematic diagram showing a network configuration of a data processing system according to a second embodiment of the present invention.

FIG. 2 is a schematic diagram showing the network configuration of the data processing system 2000 according to the second embodiment of the present invention. In FIG. 2, like components are denoted with like reference numerals as of FIG. 1 and are not further explained.

The data processing apparatus 2000 includes a computer 101, a server apparatus 201, and printer apparatuses 202, 203 which are connected via a network 104.

The printer apparatus 202 receives a printing request from the computer 101 and conducts a printing process. In this case, the printer apparatus 202 may transmit a part of the printing request as a process request to the server apparatus 201 and receive a process result corresponding to the process request from the printer apparatus 203. It is to be noted that the process request may alternatively be transmitted to the printer apparatus 203.

The server apparatus 201 receives the process request from the printer apparatus 202 and conducts a process according to the received process request. Then, the server apparatus 201 transmits the result of the process (process result) to the printer apparatus 202. Alternatively, the server apparatus 201 may transmit the process request received from the printer apparatus 202 to the printer apparatus 203.

The printer apparatus 203 receives the process request from the server apparatus 201 and conducts a process according to the received process request. Then, the printer apparatus 203 transmits the result of the process directly to the printer apparatus 202 or via the server apparatus 201.

[Network Configuration of Data Processing System 3000 According to a Third Embodiment of the Present Invention]

Figure 3:
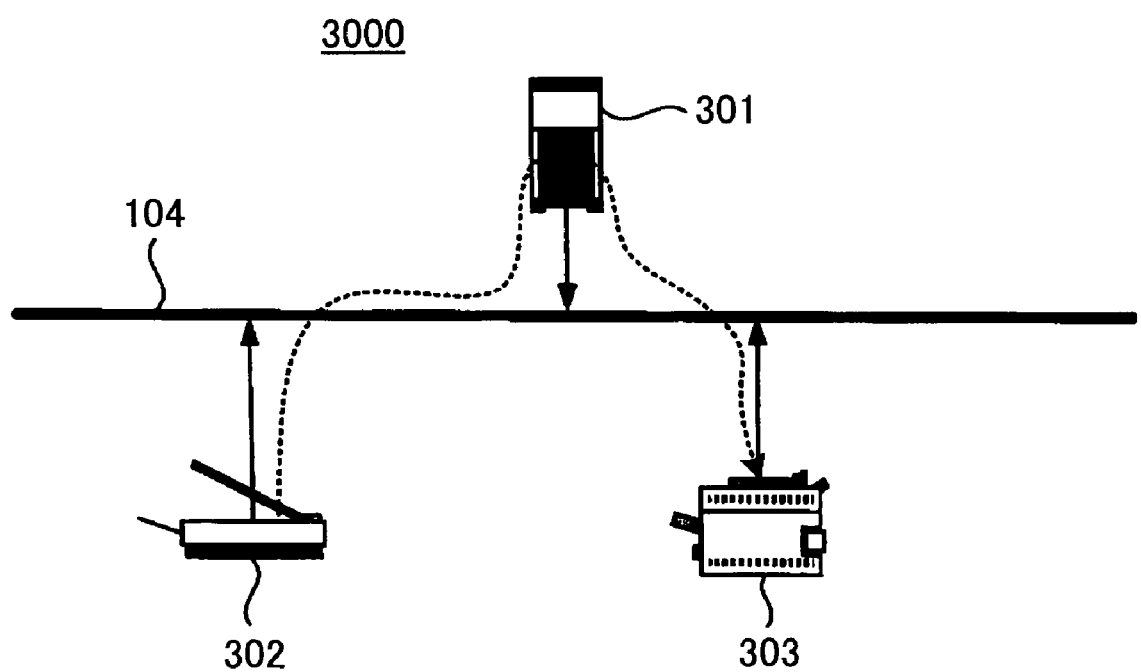
FIG. 3 is a schematic diagram showing a network configuration of a data processing system according to a third embodiment of the present invention.

FIG. 3 is a schematic diagram showing the network configuration of the data processing system 3000 according to the third embodiment of the present invention. In FIG. 3, like components are denoted with like reference numerals as of FIGS. 1, 2 and are not further explained.

The data processing system 3000 includes a server apparatus 301, a scanner apparatus 302, and a printer apparatus 303 which are connected via a network 104.

The scanner apparatus 302 reads out image data from an original (document) placed thereon by the user, generates a printing request including the image data, and transmits the printing request to the server 301.

The server apparatus 301 receives the printing request from the scanner apparatus 302 and conducts a process according to a process request included in a part of the printing request. Furthermore, the server apparatus 301 transmits the printing request to the printer apparatus 303.

The printer apparatus 303 receives the printing request from the server apparatus 301 and conducts a printing process.

It is to be noted that other printing apparatuses (data processing apparatuses) such as a digital multifunction machine, a digital copier, or a facsimile machine may be used instead of the printer apparatus 103, 202, 203, 303 of FIGS. 1 through 3.

Furthermore, other reading apparatuses (data processing apparatuses) may be used instead of the scanner apparatus 302 of FIG. 3.

[Hardware Configuration of Computer and Server Apparatus According to an Embodiment of the Present Invention]

The hardware configuration of the computer 101 and the server apparatuses 102, 201, 301 of FIGS. 1 through 3 is described in detail with reference to FIG. 4.

Figure 4:
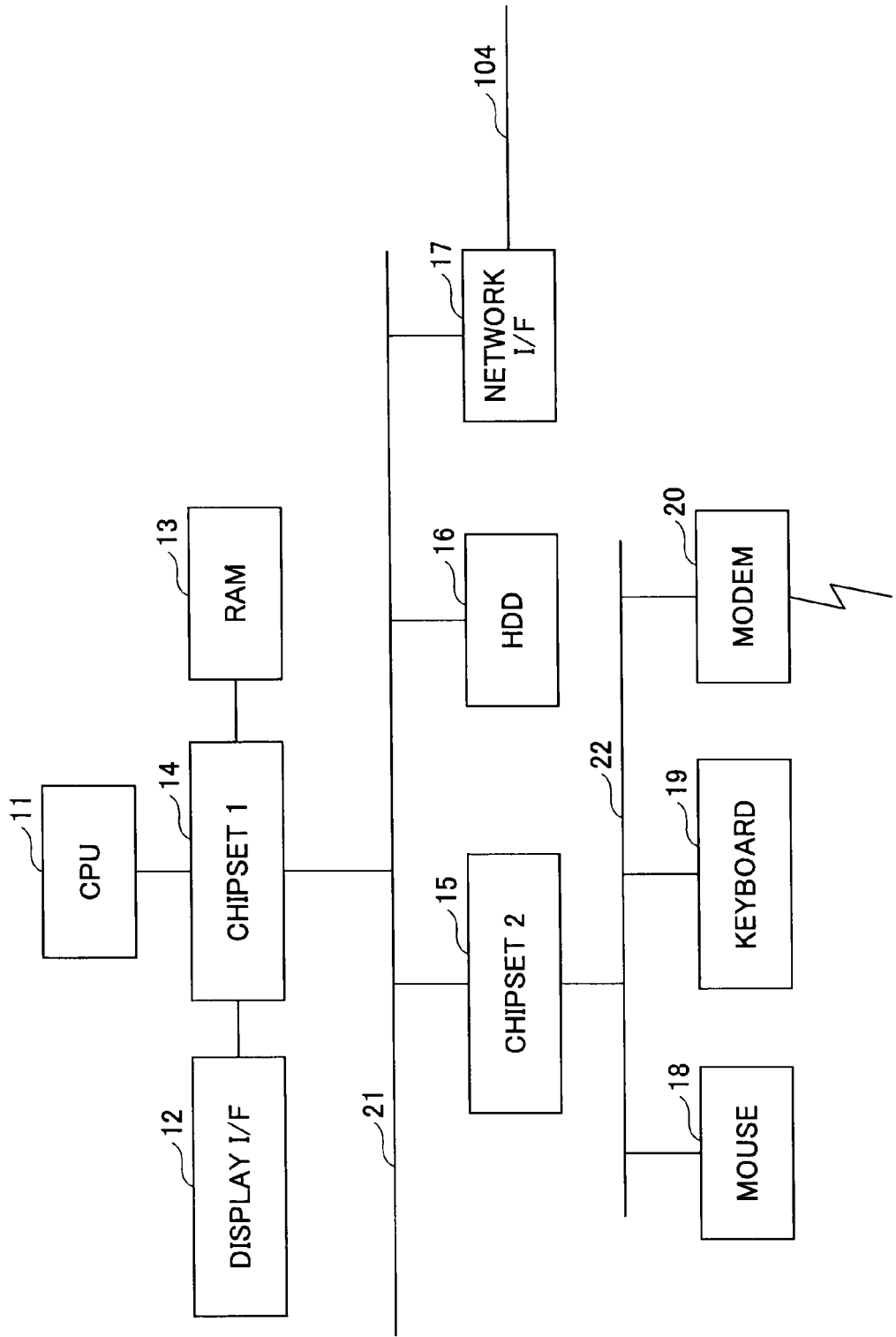
FIG. 4 is a block diagram showing a hardware configuration included in the computers and server apparatuses illustrated in FIGS. 1 through 3 according to an embodiment of the present invention.

FIG. 4 is a block diagram showing a hardware configuration of the computer 101 and the server 102, 201, 301 according to an embodiment of the present invention.

The computer (also referred to as "device") 101 and the server apparatus (also referred to as "device") 102, 201, 301, each includes a CPU 11, a display interface (the term "interface" is hereinafter also indicated as "I/F") 12, a RAM 13, a chipset 14, 15, a hard disk apparatus (hereinafter referred to as "HDD") 16, a network I/F 17, a mouse 18, a keyboard 19, and a modem 20, for example.

The CPU 11 is a central processing unit configured to perform overall control of the device (101, 102, 201, 301) according to a below-described program. By controlling the device (101, 102, 201, 301), the CPU 11 functions as a part for determining whether the device itself (101, 102, 201, 301) should conduct a process in accordance with a process request (including data that can be processed by a client apparatus) received from the client apparatus via the network 104 and as a part for conducting a process suitable for the data included in the received process request. Furthermore, the CPU 11 also functions as an image converting part (or a print data converting part), a conversion determining part, a conversion instructing part, an image dividing/transmitting part (or a print data transmitting part), a data requesting part, a process inability reporting part, a process request transmitting part, a data maintaining part, and a data presenting part.

The display I/F 12 outputs signals for displaying data (e.g., status of the device) to the user by using a monitor (display) connected to the outside.

The RAM 13 is a readable and writable memory used as, for example, a work memory providing a space for executing a program or an image storage memory for temporarily storing image data.

The chipset 14 is connected to the CPU 11, the display I/F 12, and the RAM 13 with an internal bus. The chipset 14 is also connected to an external general-purpose bus 21 for exchanging data with the outside.

The HDD 16 is a memory storage device connected to the general-purpose bus 21. The HDD 16 stores, for example, an OS (Operating System), programs and data used for performing controls related to the data processing system, data processing apparatus, and server apparatus according to an embodiment of the present invention.

The network I/F 17 is for exchanging data with outside devices (e.g., other computers and printer apparatuses) via the network 104.

The chipset 14, the HDD 16, and the network I/F 17 are connected by the general-purpose bus 21 which is slower than the internal bus.

The chipset 15 is for exchanging data with the chipset 14, the HDD 16, and the network I/F 17. The chipset 15 also exchanges data with various ports (e.g., a mouse port, a keyboard port, a modem port) via a low speed bus 22.

The mouse port and the keyboard port receive input of the user operation from the externally connected mouse 18 and keyboard 19, respectively. The modem port is configured to perform, for example, facsimile communications through a telephone line (public switched telephone network) via an external modem 20.

[Hardware Configuration of Printer Apparatus and Scanner Apparatus According to an Embodiment of the Present Invention]

Next, the hardware configuration of the printer apparatuses 103, 202, 203, 303, and the scanner apparatus 302 is described in detail with reference to FIG. 5.

Figure 5:
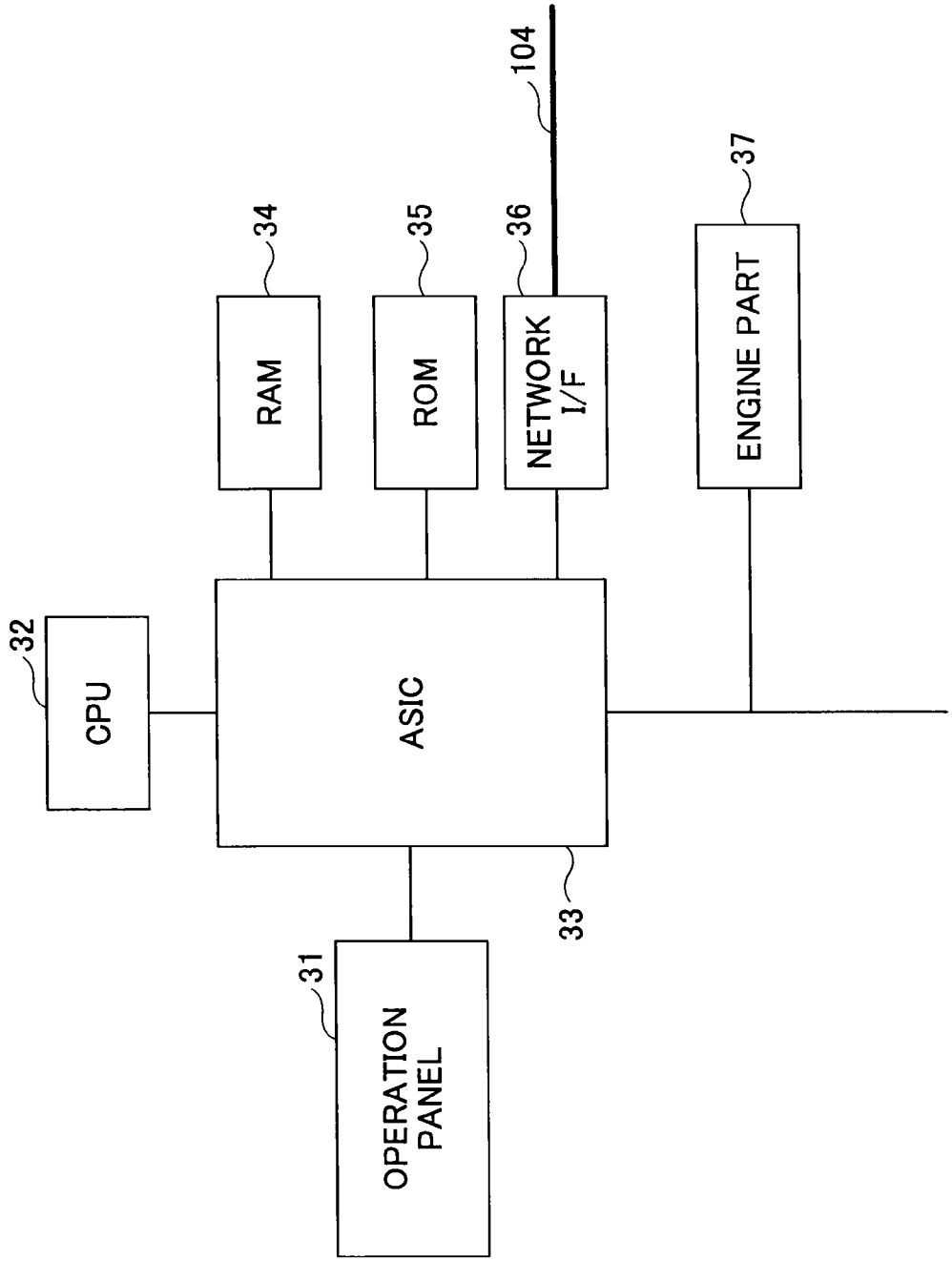
FIG. 5 is a block diagram showing a hardware configuration of the printer apparatuses and the scanner apparatus illustrated in FIGS. 1 through 3 according to an embodiment of the present invention.

FIG. 5 is a block diagram showing a hardware configuration of the printer apparatuses 103, 202, 203, 303 (also referred to as "device") and the scanner apparatus (also referred to as "device") 302 according to an embodiment of the present invention.

The printer apparatuses 103, 202, 203, 303, and the scanner apparatus 302 each have an operations panel 31, a CPU 32, an ASIC (Application Specific Integrated Circuit) 33, a RAM 34, a ROM 35, a network I/F 36, and an engine part 37.

The operations panel 31 is a control part including various operation keys (also referred to as operation switch or operation button) and a display device (e.g. LCD, CRT) for allowing the user to input operation requests (e.g., image reading request, printing request, transmission request) to the engine part 37 and other external devices.

The CPU 32 is a central processing unit configured to perform overall control of the device (103, 202, 203, 303, 302) according to a below-described program. The CPU 32 controls the input and output of modules installed in itself (i.e. printer apparatuses 103, 202, 203, 303, and the scanner apparatus 302) and various devices connected to itself (i.e. printer apparatuses 103, 202, 203, 303, and the scanner apparatus 302) via the ASIC 33. The CPU 32 also executes an application for enabling the engine part 37 to perform various processes (e.g., printing process, scanning process). The CPU 32 also functions as a process request transmitting part and an image converting part by controlling the device (103, 202, 203, 303, 302).

The ASIC 33 is a multifunction device board including, for example, plural interfaces for connecting to the CPU 32, the RAM 34, the ROM 35, the network I/F 36, and the operations panel 31. The ASIC 33 enables sharing of devices controlled by the CPU 32 for helping to attain high efficiency in executing an application or the like from an architectural aspect. The ASIC 33 includes a hardware element used for image processing.

The RAM 34 is a readable and writable memory used as, for example, a work memory providing a space for a program being executed or an image storage memory for temporarily storing image data.

The ROM 35 is a read only memory for storing a boot program, an OS, and various programs used for performing controls related to the data processing system, data processing apparatus, and server apparatus according to an embodiment of the present invention.

The network I/F 36 is an interface for exchanging data with external devices (e.g., computers) via the network 104.

In a case where the device is a printer apparatus (103, 202, 203, 303), the engine part 37 functions as a printing mechanism part (image forming part) that prints print data in the form of a visible image onto paper (may also be other recording media). In a case where the print data are configured in a PDL (page description language), it is necessary to convert the print data to image data (e.g., bit map data) so that a visible image can be printed onto the recording medium. The conversion is described in detail below. In a case where the device is a scanner apparatus 302, an image of an original (document) is optically read by an optical reading mechanism part (image reading part).

Next, operation controls related to the data processing system, data processing apparatus, and server apparatus according to embodiments of the present invention are described in detail with reference to FIGS. 6 and 7.

First Embodiment

The first embodiment of the present invention is described with reference to FIGS. 6 and 7.

Figure 6:
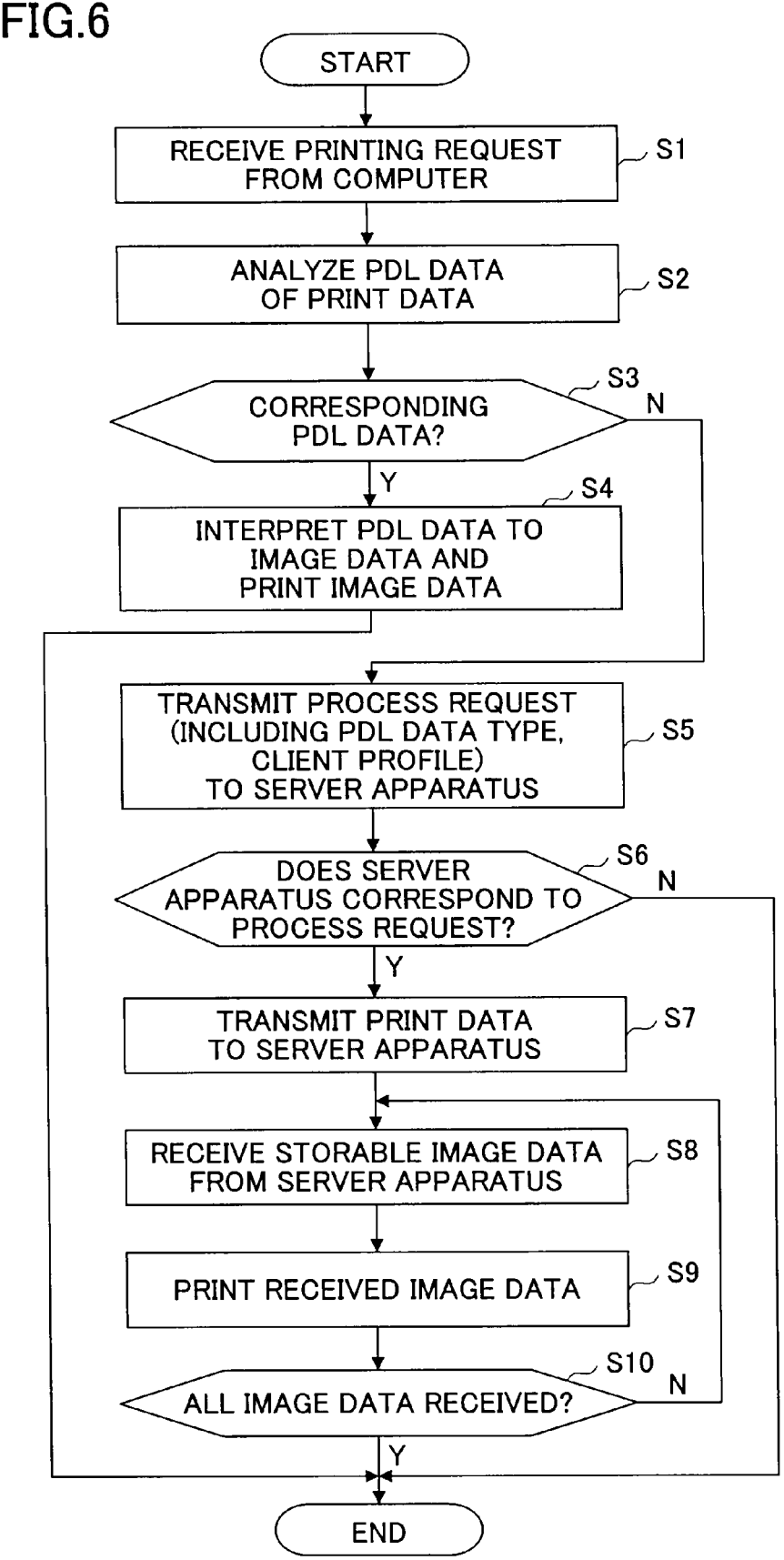
FIG. 6 is a flowchart showing a first example of operation controls performed in a case where a printer apparatus in a data processing system shown in FIG. 1 receives a printing request from a computer in a network according to an embodiment of the present invention.

FIG. 6 is a flowchart showing a first example of operation controls performed in a case where the printer apparatus 103 in the data processing system 1000 shown in FIG. 1 receives a printing request from the computer 101 in the network 104.

First, in Step S1, the printer apparatus 103 receives a printing request from the computer 101 in the network 104 via the network I/F 36 shown in FIG. 5. Then, in Step S2, the printer apparatus 103 obtains print data contained in the received printing request and analyzes the PDL (Page Description Language) data of the print data. The analysis is normally performed by comparing the first few bytes.

Then, in Step S3, the printer apparatus 103 determines whether the PDL data of the print data correspond to itself (in this case, printer apparatus 103) based on the result of the analysis. That is, the printer apparatus 103 determines whether the PDL data of the print data can be processed (processable data) by itself (in this case, printer apparatus 103).

Then, in a case where the PDL data of the print data correspond to itself (Yes in Step S3), the PDL data are interpreted and converted to image data in the RAM 34 by using the functions of the CPU 32 and the ASIC 33; then the converted image data are sent to the engine part 37, and then the image data are subject to a printing process by the engine part 37 (i.e. the engine part 37 prints the image data) in Step S4. The operation control shown in FIG. 6 is terminated after the image data are printed.

In a case where the PDL data of the print data do not correspond to itself (No in Step S3), the printer apparatus 103 transmits a process request including data indicating the type of PDL data (PDL type data) and a client profile (client profile data) to an outside server apparatus (in this case, server apparatus 102) in Step S5. In this case, the client profile data are data indicating the size of its memory space (in this case, the memory space of the printer apparatus 103) that can be used for printing (image buffer memory capacity).

Then, the printer apparatus 103 receives a response from the server apparatus 102 reporting whether the PDL data indicated in the transmitted process request can be processed by the server apparatus 102. In a case where the response reports that the server apparatus 102 is unable to process the PDL data (i.e. a case where the response from the server apparatus 102 is a process inability report) (No in Step S6), the operation control shown in FIG. 6 is terminated. In a case where the response reports that the server apparatus 102 is able to process the PDL data (i.e. a case where the response from the server apparatus 102 is a data request) (Yes in Step S6), the printer apparatus 103 transmits the obtained print data to the server apparatus 102 in Step S7. Then, the printer apparatus 103 receives image data (storable image data) transmitted from the server apparatus 102 in response to the transmitted print data in Step S8. It is to be noted that the size of the image data (storable image data) transmitted from the server apparatus 102 is substantially equivalent to the size of the memory space of the RAM 34 loaded for the printer apparatus 103 for the purpose of printing (loaded memory size).

Then, the received image data are interpreted in the RAM 34, sent to the engine part 37, and printed by the engine part 37 in Step S9. Then, it is determined whether all of the image data have been received from the server apparatus 102 in Step S10. When all of the image data have been received (Yes in Step S10), the operation control shown in FIG. 6 is terminated. In a case where all of the image data have not yet been received (No in Step S10), the operation returns to Step S8 for further receiving storable image data (subsequent image data) from the server apparatus 102, further performing the printing process of Step S9, and determining whether all of the image data have been received from the server apparatus 102 in Step S10. The steps of S8 through S10 are repeated until the printer apparatus 103 receives all of the image data from the server apparatus 102.

Figure 7:
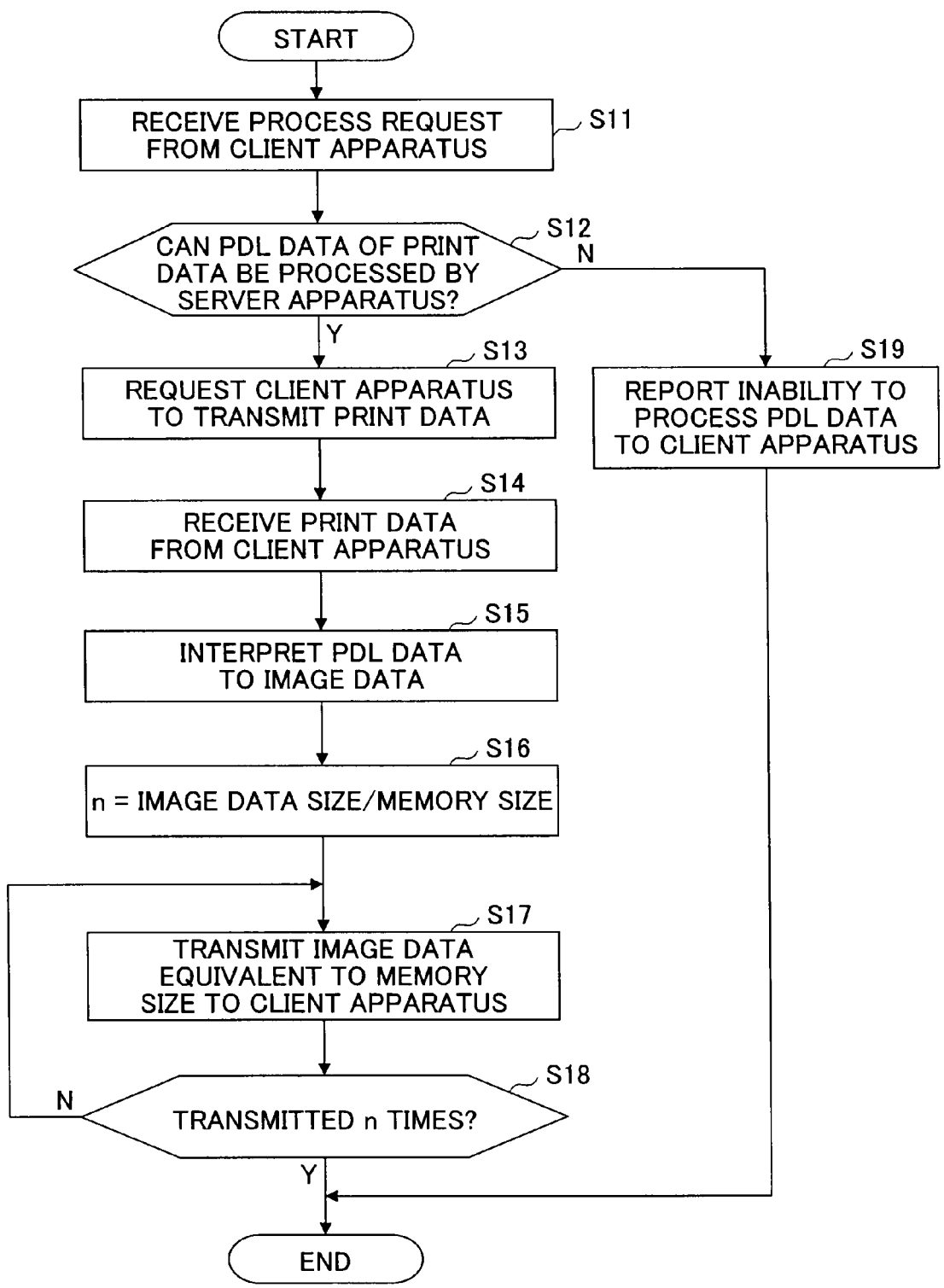
FIG. 7 is a flowchart showing a first example of operation controls performed in a case where a server apparatus in a data processing system shown in FIG. 1 receives a process request from a client apparatus in a network according to an embodiment of the present invention.

FIG. 7 is a flowchart showing a first example of operation controls performed in a case where the server apparatus 102 in the data processing system 1000 shown in FIG. 1 receives a process request from a client apparatus (in this case, the printer apparatus 103) in the network 104.

First, in Step S11, the server apparatus 102 receives a process request from a client apparatus (in this case, the printer apparatus 103) via the network interface 17 shown in FIG. 4. The process request includes data indicating the type of PDL data (PDL type data) and data indicating the size of the memory space of the client apparatus (printer apparatus 103) that can be used for printing (client profile data).

Then, the server apparatus 102 determines whether the PDL data indicated by the PDL type data of the received process request correspond to itself (server apparatus 102) in Step S12. In other words, the server apparatus 102 determines whether the server apparatus 102 itself can process the PDL data based on the PDL type data in the received process request. In a case where the server apparatus 102 determines that it (server apparatus 102) is unable to process the PDL data (No in Step S12), the server apparatus 102 reports its inability to process the PDL data (process inability report) to the printer apparatus 103 in Step S19. Thereby, when the process inability is reported, the operation shown in FIG. 7 is terminated. In a case where the server apparatus 102 determines that it (server apparatus 102) is able to process the PDL data (Yes in Step S12), the server apparatus 102 transmits a data request to the printer apparatus 103 for requesting the printer apparatus 103 to transmit the print data in Step S13.

Then, the server apparatus 102 receives the print data transmitted from the printer apparatus 103 in response to the data request in Step 14. Then, the server apparatus 102 interprets and converts the PDL data in the RAM 13 into image data by using the functions of the CPU 11 in Step S15. Furthermore, the server apparatus 102 performs the following operation control (Steps S16 through S18) by using the client profile data included in the process request transmitted from the printer apparatus 103.

Then, the server apparatus 102 calculates the size of the entire interpreted image data (all of the image data required for printing) interpreted in the RAM 13, compares the calculated size of the entire image data (image data size) with the loaded memory size, and determines how many times larger/smaller the image data size is compared to the loaded memory size, to thereby obtain a multiple "n" (image data size/loaded memory size). In a case where "n" is 1 or less, the image data size falls within the loaded memory size. Accordingly, the entire interpreted image data are transmitted to the printer apparatus 103 at a single time (once). In a case where "n" is greater than 1, the image data size is greater than the loaded memory size. Therefore, in this case, the entire interpreted image data are divided into fragments so that each fragment is substantially equivalent to the loaded memory size. Accordingly, the fragments are successively transmitted to the printer apparatus 103 for n times. When all of the image data are transmitted, that is, when the transmission of the image data is performed n times (Yes in Step S18), the operation control shown in FIG. 7 is terminated.

With the above-described first embodiment of the data processing system 1000 including the printer apparatus 103 configured to conduct the operation control shown in FIG. 6 and the server apparatus 102 configured to conduct the operation control shown in FIG. 7, a process which cannot be performed by a printer apparatus 103 alone can be performed by the data processing system 1000 by having the printer apparatus 103 transmit processible data to the server apparatus 102 and having the server apparatus 102 perform a process based on the transmitted processible data (process suitable for the processible data). Furthermore, since the loaded memory size (buffer memory capacity) is included in the processible data transmitted from the printer apparatus 103 to the server apparatus 102, the server apparatus 102 can transmit data to the printer apparatus 103 in a size substantially equivalent to the loaded memory size. Therefore, the data processing system can perform printing even where the loaded memory size of the printer apparatus 103 is small.

Second Embodiment

Next, the second embodiment of the present invention is described with reference to FIGS. 8 and 9.

Figure 8:
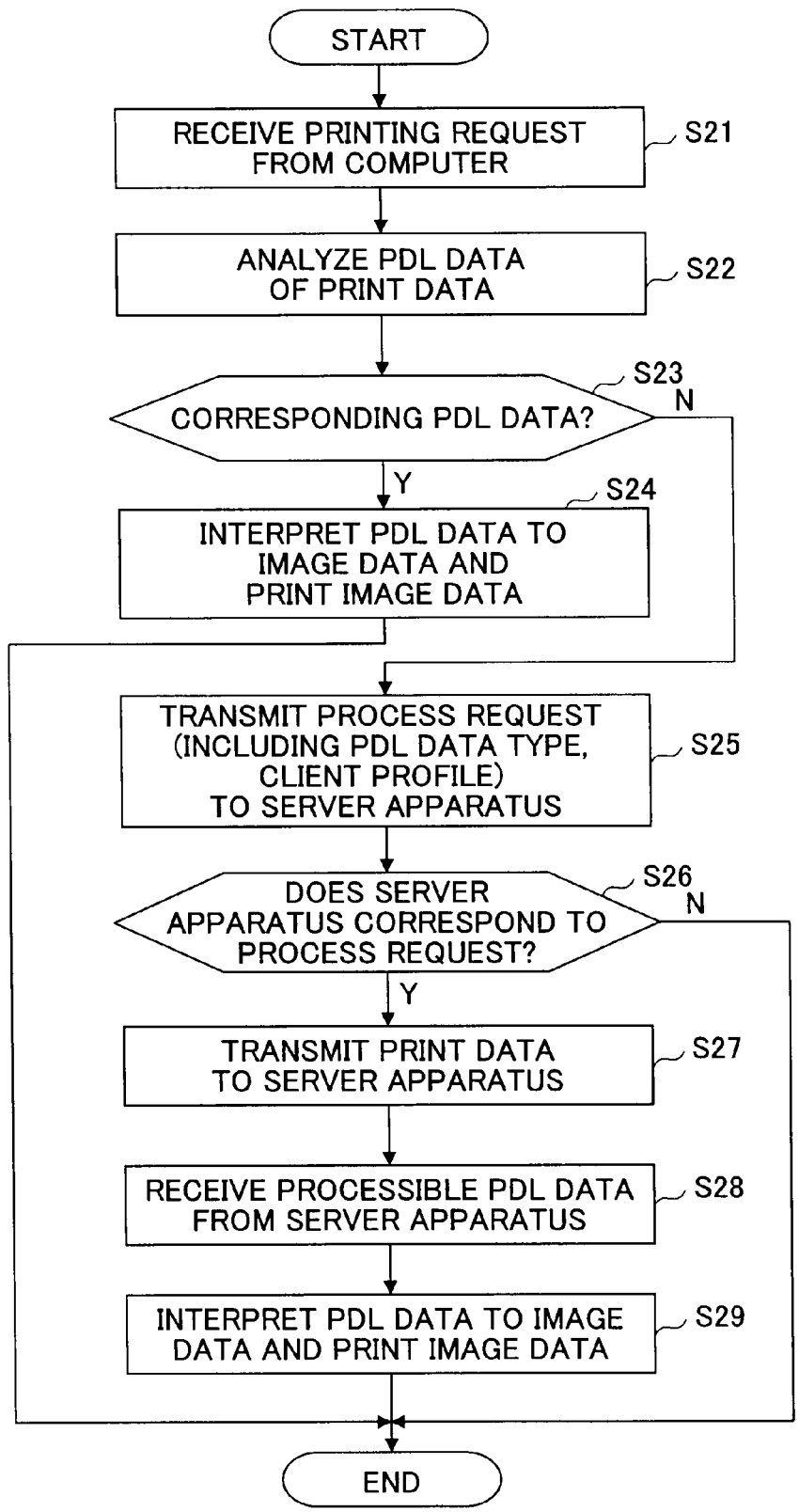
FIG. 8 is a flowchart showing a second example of operation controls performed in a case where a printer apparatus in a data processing system shown in FIG. 1 receives a printing request from a computer in a network according to an embodiment of the present invention.

FIG. 8 is a flowchart showing a second example of operation controls performed in a case where the printer apparatus 103 in the data processing system 1000 shown in FIG. 1 receives a printing request from the computer 101 in the network 104.

First, in Step S21, the printer apparatus 103 receives a printing request from the computer 101 in the network 104 via the network I/F 36 shown in FIG. 5. Then, in Step S22, the printer apparatus 103 obtains print data contained in the received printing request and analyzes the PDL (Page Description Language) data of the print data. Then, in Step S23, the printer apparatus 103 determines whether the PDL data of the print data corresponds to itself (in this case, printer apparatus 103) based on the result of the analysis.

Then, in a case where the PDL data of the print data correspond to itself (Yes in Step S23), the PDL data in the RAM 34 are interpreted and converted to image data by using the functions of the CPU 32 and the ASIC 33; then the converted image data are sent to the engine part 37, and then the image data are subject to a printing process by the engine part 37 (i.e. the engine part 37 prints the image data) in Step S24. The operation control shown in FIG. 8 is terminated after the image data are printed.

In a case where the PDL data of the print data do not correspond to itself (No in Step S23), the printer apparatus 103 transmits a process request including data indicating the type of PDL data (PDL type data) and a client profile (client profile data) to an outside server apparatus (in this case, server apparatus 102) in Step S25. In this case, the client profile data are data indicating a list of types of PDL data supported by itself (printer apparatus 103), that is, a list of types of PDL data that can be processed by the printer apparatus 103 (processible data-type data).

Then, the printer apparatus 103 receives a response from the server apparatus 102 reporting whether the PDL data indicated in the transmitted process request can be processed by the server apparatus 102. In a case where the response reports that the server apparatus 102 is unable to process the PDL data (i.e. a case where the response from the server apparatus 102 is a process inability report) (No in Step S26), the operation control shown in FIG. 8 is terminated. In a case where the response reports that the server apparatus 102 is able to process the PDL data (i.e. a case where the response from the server apparatus 102 is a data request) (Yes in Step S26), the printer apparatus 103 transmits the obtained print data to the server apparatus 102 in Step S27. Then, the printer apparatus 103 receives PDL data that can be processed by itself (printer apparatus 103) from the server apparatus 102 in response to the transmitted print data in Step S28. Then, in the same manner as Step S24, the PDL data in the RAM 34 are interpreted and converted to image data and are then subject to a printing process by the engine part 37 (i.e. the engine part 37 prints the image data) in Step S29. The operation control shown in FIG. 8 is terminated after the image data are printed.

Figure 9:
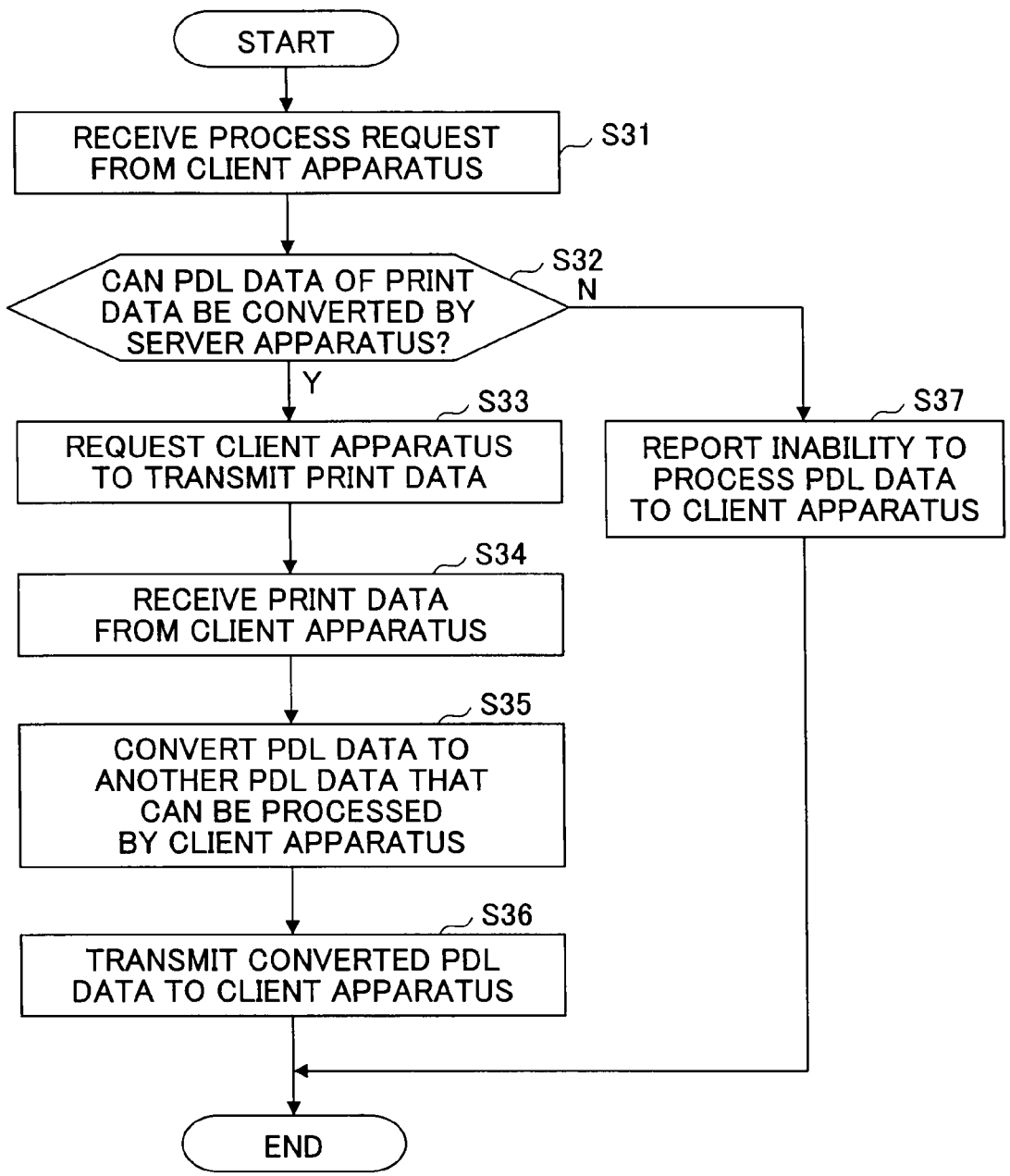
FIG. 9 is a flowchart showing a second example of operation controls performed in a case where a server apparatus in a data processing system shown in FIG. 1 receives a process request from a client apparatus in a network according to an embodiment of the present invention.

FIG. 9 is a flowchart showing a second example of operation controls performed in a case where the server apparatus 102 in the data processing system 1000 shown in FIG. 1 receives a process request from a client apparatus (in this case, the printer apparatus 103) in the network 104.

First, in Step S31, the server apparatus 102 receives a process request from a client apparatus (in this case, the printer apparatus 103) via the network interface 17 shown in FIG. 4. The process request includes data indicating the type of PDL data (PDL type data) and data indicating a list of types of PDL data that can be processed by the printer apparatus 103 (client profile data).

Then, the server apparatus 102 determines whether the server apparatus 102 has a function of converting the PDL data in the print data indicated by the PDL type data in the process request into PDL data that can be processed by the printer apparatus 103. In a case where the server apparatus 102 determines that it (server apparatus 102) does not have such a function of converting the PDL data of the print data into PDL data that can be processed by the printer apparatus 103 (No in Step S32), the server apparatus 102 reports its inability to convert (process) the PDL data (process inability report) to the printer apparatus 103 in Step S37. Thereby, when the process inability is reported, the operation shown in FIG. 9 is terminated. In a case where the server apparatus 102 determines that it (server apparatus 102) has a function of converting the PDL data of the print data into PDL data that can be processed by the printer apparatus 103 (Yes in Step S32), the server apparatus 102 transmits a data request to the printer apparatus 103 for requesting the printer apparatus 103 to transmit the print data in Step S33.

Then, the server apparatus 102 receives the print data transmitted from the printer apparatus 103 in response to the data request in Step 34. Then, the server apparatus 102, by using the function of the CPU 11, interprets and converts the PDL data of the print data into PDL data that can be processed by the printer apparatus 103 in Step S35. Then, the server apparatus 102 transmits the converted PDL data to the printer apparatus 103. After the converted PDL data are transmitted to the printer apparatus 103, the operation shown in FIG. 9 is terminated.

With the above-described second embodiment of the data processing system 1000 including the printer apparatus 103 configured to conduct the operation control shown in FIG. 8 and the server apparatus 102 configured to conduct the operation control shown in FIG. 9, a function which cannot be realized by a printer apparatus 103 alone can be realized by the data processing system 1000 by having the printer apparatus 103 transmit data regarding PDL data that can be processed by the printer apparatus 103 (processible data) and PDL data of the print data to the server apparatus 102 and having the server apparatus 102 perform a process based on the transmitted data. Furthermore, since the conversion from one type of PDL data to another type of PDL data is performed by the server apparatus 102, the driver function of the computer 101 used for providing print data to the printer apparatus 103 is not limited by the printer apparatus 103.

It is to be noted that, in the above-described first embodiment of the data processing system shown in FIG. 1, the computer 101 sends a process request to the printer apparatus 103; the printer apparatus 103 transmits data targeted for the process and data that can be processed by the printer apparatus 103 to the server apparatus 102; then the server apparatus 102 performs the pertinent process on the transmitted target data; the server apparatus 102 transmits the processed data to the printer apparatus 103; and then the printer apparatus 103 prints the processed data.

Thus, if the server apparatus 102 is prepared to perform various processes on PDL data, the printer apparatus 103 does not need to respond to the user's requests to process PDL data. Conversely, the computer 101 does not require a driver which is dependent on the printer apparatus 103. Furthermore, in a case where numerous printer apparatuses 103 exist in the network 104, the data processing system 1000 can attain a significant efficiency by having the server apparatus 102 process PDL data for all of the printer apparatuses 103.

In the above-described second embodiment of the data processing system 2000, the printer apparatuses 202, 203 each have a PDL processing function for interpreting image data. Thus, the printer apparatus 203 performs a process in accordance with a process request from the other printer apparatus (client apparatus) 202 (e.g., requesting a process of converting PDL data into image data or a process of converting PDL data into another PDL data type processible by the other printer apparatus 202) via the server apparatus 201, and returns processed data (e.g., image data or PDL data processible by the printer apparatus 202) to the printer apparatus 202. In other words, the printer apparatus 203 has a function of acting as the server apparatus 102 described in FIG. 1 of the first embodiment of the present invention. It is to be noted that the printer apparatus 203 may also directly receive a process request from the other printer apparatus 202. The processes by the printer apparatuses 202, 203 and the server apparatus 201 are further described in the following third through sixth embodiments of the present invention.

Third Embodiment

The third embodiment of the present invention is described with reference to FIG. 10.

Figure 10:
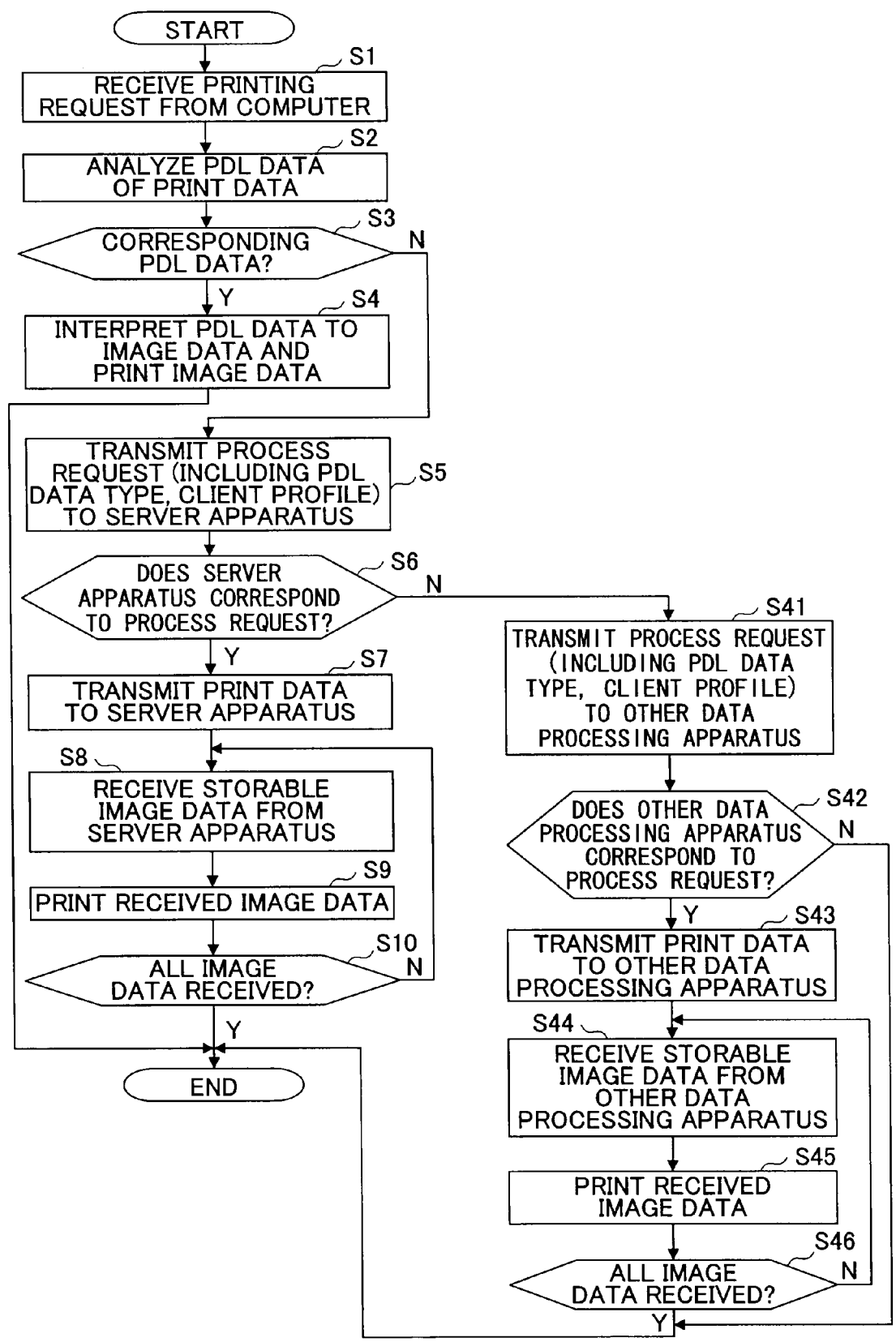
FIG. 10 is a flowchart showing a first example of operation controls performed in a case where a printer apparatus in a data processing system shown in FIG. 2 receives a printing request from a computer in a network according to an embodiment of the present invention.

FIG. 10 is a flowchart showing a first example of operation controls performed in a case where the printer apparatus 202 in the data processing system 2000 shown in FIG. 2 receives a printing request from the computer 101 in the network 104.

The printer apparatus 202 performs the operation controls described in Steps S1 through S10 of FIG. 10 in the same manner as Steps S1 through S10 described of FIG. 6 of the first embodiment of the present invention. It is, however, to be noted that the communications of Step S5 and the steps following Step S5 are with a server apparatus 201.

In Step S6 of FIG. 10, the server apparatus 201 determines whether the PDL data indicated in a process request (i.e. a process request including the type of PDL data (PDL type data) of the print data contained in the printing request and client profile data) transmitted from the printer apparatus 202 can be processed by itself (server apparatus 201). In a case where the server apparatus 201 determines that it cannot process the PDL data (i.e. a case where the response from the server apparatus 201 is a process inability report) (No in Step S6), the process request is transmitted to another data processing apparatus (in this case, the printer apparatus 203) via the server apparatus 201 in Step S41.

Then, the printer apparatus 202 receives a response from the printer apparatus 203 indicating whether the printer apparatus 203 can process the PDL data in Step S42. In a case where the response reports that the printer apparatus 203 is unable to process the PDL data (i.e. a case where the response from the printer apparatus 203 is a process inability report) (No in Step S42), the operation control shown in FIG. 10 is terminated. In a case where the response reports that the printer apparatus 203 is able to process the PDL data (i.e. a case where the response from the printer apparatus 203 is a data request) (Yes in Step S42), the printer apparatus 202 transmits the print data obtained from the printing request to the printer apparatus 203 in Step S43. Then, the printer apparatus 202 receives image data (storable image data) transmitted from the printer apparatus 203 in response to the transmitted print data in Step S44. It is to be noted that the size of the image data (storable image data) transmitted from the printer apparatus 203 is substantially equivalent to the size of the memory space of the RAM 34 allocated to the printer apparatus 202 for the purpose of printing (loaded memory size).

Then, the received image data are processed in the RAM 34, sent to the engine part 37, and printed by the engine part 37 in Step S45. Then, it is determined whether all of the image data have been received from the printer apparatus 203 in Step S46. When all of the image data have been received (Yes in Step S46), the operation control shown in FIG. 10 is terminated. In a case where all of the image data have not yet been received (No in Step S46), the operation returns to Step S44 for receiving additional storable image data (subsequent image data) from the printer apparatus 203, further performing the printing process of Step S45, and determining whether all of the image data have been received from the printer apparatus 203 in Step S46. The steps of S44 through S46 are repeated until the printer apparatus 202 receives all of the image data from the printer apparatus 203.

In a case where the printer apparatus 203 receives a process request from a client apparatus (printer apparatus 202), the same operation controls as those of the FIG. 7 are performed.

With the above-described third embodiment of the data processing system 2000 including the printer apparatus 202 configured to conduct the operation control shown in FIG. 10 and the server apparatus 201 and the printer apparatus 203 configured to conduct the operation control shown in FIG. 7, a process which cannot be performed by a printer apparatus 202 alone can be realized by the data processing system 2000 by having the printer apparatus 202 transmit processible data to the server apparatus 201 or the printer apparatus 203 and having the server apparatus 201 or the printer apparatus 203 perform a process based on the transmitted processible data (process suitable for the processible data). Furthermore, since the loaded memory size (buffer memory capacity) is included in the processible data transmitted from the printer apparatus 202 to the server apparatus 201 or the printer apparatus 203, the server apparatus 201 or the printer apparatus 203 can transmit data to the printer apparatus 202 in a size substantially equivalent to the loaded memory size. Therefore, the data processing system 2000 can perform printing even where the loaded memory size of the printer apparatus 202 is small.

Fourth Embodiment

Next, the fourth embodiment of the present invention is described with reference to FIG. 11.

Figure 11:
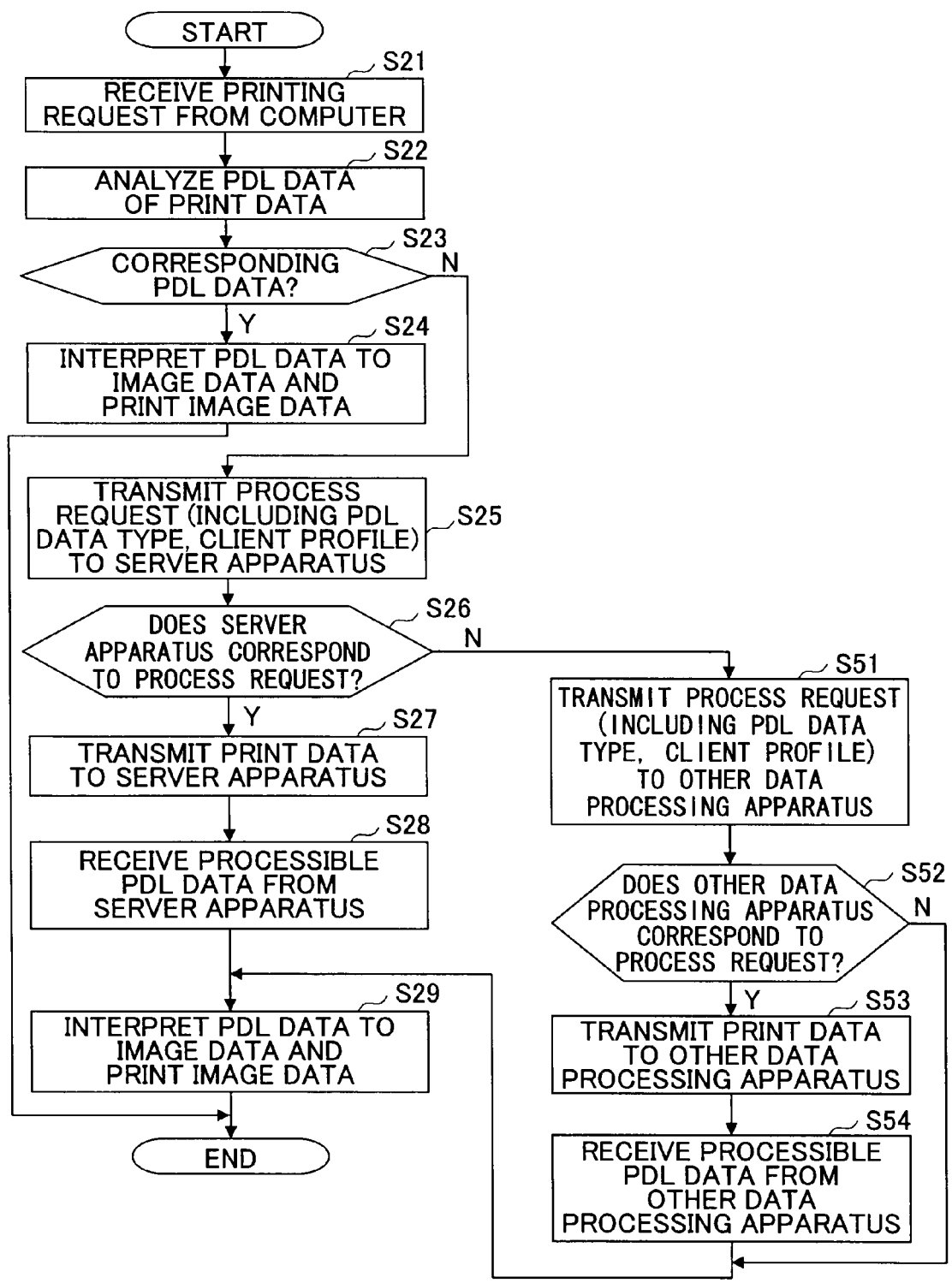
FIG. 11 is a flowchart showing a second example of operation controls performed in a case where a printer apparatus in a data processing system shown in FIG. 2 receives a printing request from a computer in a network according to an embodiment of the present invention.

FIG. 11 is a flowchart showing a second example of operation controls performed in a case where the printer apparatus 202 in the data processing system 2000 shown in FIG. 2 receives a printing request from the computer 101 in the network 104.

The printer apparatus 202 performs the operation controls described in Steps S21 through S29 of FIG. 11 in the same manner as Steps S21 through S29 described of FIG. 8 of the second embodiment of the present invention. It is, however, to be noted that the communications of Step S25 and the steps following Step S25 are with a server apparatus 201.

In Step S26 of FIG. 11, the printer apparatus 202 receives a response of the results of the server apparatus 201 determining whether the PDL data indicated in a process request (i.e. a process request including type of PDL data (PDL type data) of the print data contained in the printing request and client profile data) transmitted from the printer apparatus 202 can be processed by the server apparatus 201. In a case where the server apparatus 201 determines that it cannot process the PDL data (i.e. a case where the response from the server apparatus 201 is a process inability report) (No in Step S26), the process request is transmitted to another data processing apparatus (in this case, the printer apparatus 203) via the server apparatus 201 in Step S51.

Then, the printer apparatus 202 receives a response from the printer apparatus 203 indicating whether the printer apparatus 203 can process the PDL data in Step S52. In a case where the response reports that the printer apparatus 203 is unable to process the PDL data (i.e. a case where the response from the printer apparatus 203 is a process inability report) (No in Step S52), the operation control shown in FIG. 11 is terminated. In a case where the response reports that the printer apparatus 203 is able to process the PDL data (i.e. a case where the response from the printer apparatus 203 is a data request) (Yes in Step S52), the printer apparatus 202 transmits the print data obtained from the printing request to the printer apparatus 203 in Step S53. Then, the printer apparatus 202 receives processible PDL data (PDL data that can be processed by the printer apparatus 202) transmitted from the printer apparatus 203 in response to the transmitted print data in Step S54. Then, the received PDL data in the RAM 34 are converted to image data, sent to the engine part 37, and printed by the engine part 37 in Step S29. The operation control shown in FIG. 11 is terminated after the image data are printed in Step S29.

In a case where the printer apparatus 203 receives a process request from a client apparatus (printer apparatus 202), the same operation controls as those of the FIG. 9 are performed.

With the above-described fourth embodiment of the data processing system 2000 including the printer apparatus 202 configured to conduct the operation control shown in FIG. 11 and the server apparatus 201 and the printer apparatus 203 configured to conduct the operation control shown in FIG. 9, a function which cannot be performed by a printer apparatus 202 alone can be performed by the data processing system 2000 by having the printer apparatus 202 transmit data regarding PDL data that can be processed by the printer apparatus 202 (processible data) and PDL data of the print data to the server apparatus 201 or the printer apparatus 203 and having the server apparatus 201 or the printer apparatus 203 perform a process based on the transmitted data. Furthermore, since the conversion from one type of PDL data to another type of PDL data is performed by the server apparatus 201 or the printer apparatus 203, the driver function of the computer 101 used for providing print data to the printer apparatus 202 is not be limited by the printer apparatus 202.

Fifth Embodiment

The fifth embodiment of the present invention is described with reference to FIGS. 12 and 13.

Figure 12:
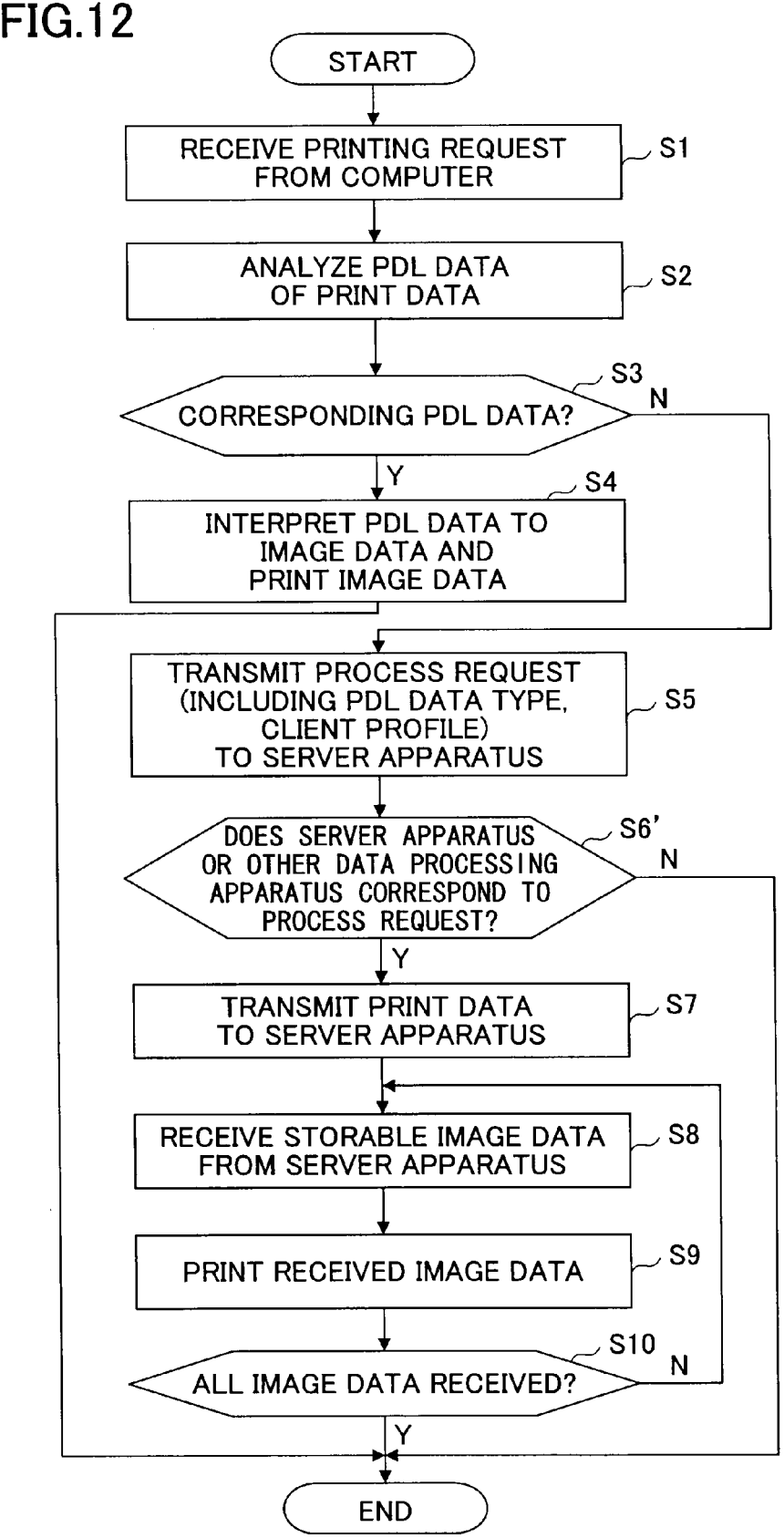
FIG. 12 is a flowchart showing a third example of operation controls performed in a case where a printer apparatus in a data processing system shown in FIG. 2 receives a printing request from a computer in a network according to an embodiment of the present invention.

FIG. 12 is a flowchart showing a third example of operation controls performed in a case where the printer apparatus 202 in the data processing system 2000 shown in FIG. 2 receives a printing request from the computer 101 in the network 104.

The printer apparatus 202 performs the operation controls described in Steps S1 through S5 of FIG. 12 in the same manner as Steps S1 through S5 described of FIG. 10 of the third embodiment. Then, in Step S6' of FIG. 10, the server apparatus 201 or the printer apparatus 203 determines whether the PDL data indicated in a process request (i.e. a process request including type of PDL data (PDL type data) of the print data contained in the printing request and a client profile data) transmitted from the printer apparatus 202 can be processed by itself (server apparatus 201 or printer apparatus 203). In a case where the server apparatus 201 or the printer apparatus 203 determines that it cannot process the PDL data (i.e. a case where the response from the server apparatus 201 or the printer apparatus 203 is a process inability report) (No in Step S6'), the operation control shown in FIG. 12 is terminated.

In a case where the response reports that the server apparatus 201 or the printer apparatus 203 is able to process the PDL data (i.e. a case where the response from the server apparatus 201 or the printer apparatus 203 is a data request) (Yes in Step S6'), Steps S7 through S10 of FIG. 12 are performed in the same manner as Steps S7 through S10 of FIG. 10 of the third embodiment of the present invention.

Figure 13:
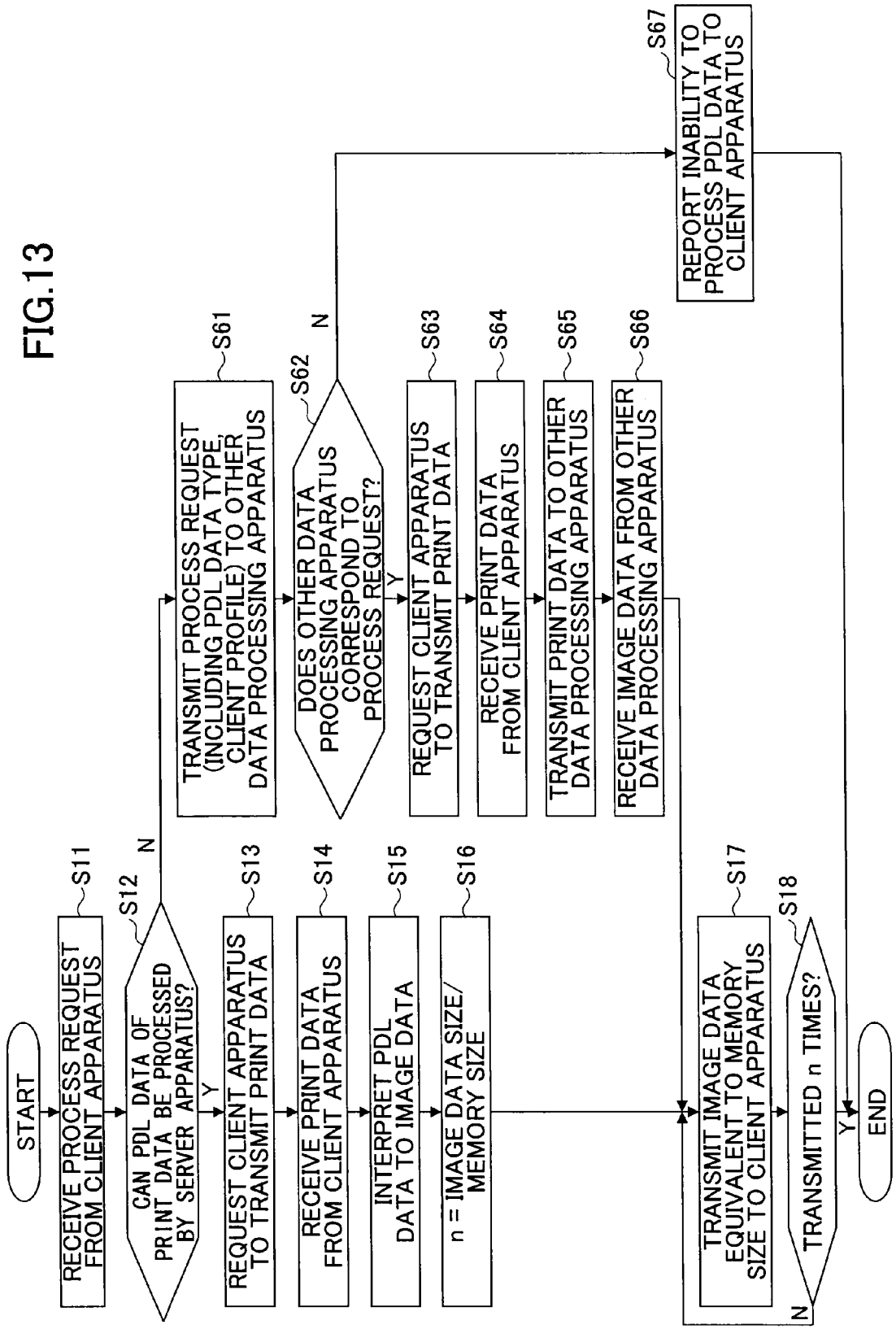
FIG. 13 is a flowchart showing a first example of operation controls performed in a case where a server apparatus in a data processing system shown in FIG. 2 receives a process request from a client apparatus in a network according to an embodiment of the present invention.

FIG. 13 is a flowchart showing a first example of operation controls performed in a case where the server apparatus 201 in the data processing system 2000 shown in FIG. 2 receives a process request from a client apparatus (in this case, the printer apparatus 202) in the network 104.

The server apparatus 201 performs the operation controls described in Steps S11 through S18 of FIG. 13 in the same manner as Steps S11 through S18 described of FIG. 7 of the first embodiment of the present invention. It is, however, to be noted that the client apparatus in this example is the printer apparatus 202.

In Step S12, after receiving a process request from the client apparatus (printer apparatus 202), the server apparatus 201 determines whether the PDL data indicated by the PDL type data of the process request corresponds to itself (server apparatus 201). In other words, the server apparatus 201 determines whether the server apparatus 201 itself can process the PDL data based on the PDL type data in the received process request. In a case where the server apparatus 201 determines that it (server apparatus 201) is unable to process the PDL data (No in Step S12), the server apparatus 201 transmits the received process request (including PDL type data and client profile data) to another data processing apparatus (in this case, the printer apparatus 203) in Step S61. Then, the server apparatus 201, in response to the process request transmitted in Step S61, receives a report from the printer apparatus 203 indicating whether the printer apparatus 203 is able to process the PDL data in Step 62. In a case where the printer apparatus 203 is unable to process the PDL data (i.e. a case where the response from the printer apparatus 203 is a process inability report), the server apparatus 201 reports the inability of the printer apparatus 203 to the printer apparatus 202 in Step S67. Thereby, when the process inability is reported, the operation shown in FIG. 13 is terminated.

In a case where the printer apparatus 203 determines that it (printer apparatus 203) is able to process the PDL data (i.e. a case where the response from the printer apparatus 203 is a data request), the server apparatus 201 transmits a data request to the printer apparatus 202 for requesting the printer apparatus 202 to transmit the print data in Step S63. When the server apparatus 201 receives the print data from the printer apparatus 202 in Step S64, the server apparatus 201 transmits the received print data to the printer apparatus 203 in Step S65. Then, the server apparatus 201, in response to the transmitted print data, receives image data from the printer apparatus 203 in Step S66. Then, by repeating Steps S17 and S18, the fragments of the image data are successively transmitted to the printer apparatus 202 for n times.

When the printer apparatus 203 receives a process request from the client apparatus (in this case, server apparatus 201), the printer apparatus 203 performs the same operation controls as those described in FIG. 7.

With the above-described fifth embodiment of the data processing system 2000 including the printer apparatus 202 configured to conduct the operation control shown in FIG. 12, the server apparatus 201 configured to conduct the operation control shown in FIG. 13, and the printer apparatus 203 configured to conduct the operation control shown in FIG. 7, a process which cannot be performed by a printer apparatus 202 alone can be performed by the data processing system 2000 by having the printer apparatus 202 transmit processible data to the server apparatus 201 or the printer apparatus 203 and having the server apparatus 201 or the printer apparatus 203 perform a process based on the transmitted processible data. Furthermore, since the loaded memory size is included in the processible data transmitted from the printer apparatus 202 to the server apparatus 201 or the printer apparatus 203, the server apparatus 201 or the printer apparatus 203 can transmit data to the printer apparatus 202 in a size substantially equivalent to the loaded memory size. Therefore, the data processing system 2000 can perform printing even where the loaded memory size of the printer apparatus 202 is small.

Sixth Embodiment

Next, the sixth embodiment of the present invention is described with reference to FIGS. 14 and 15.

Figure 14:
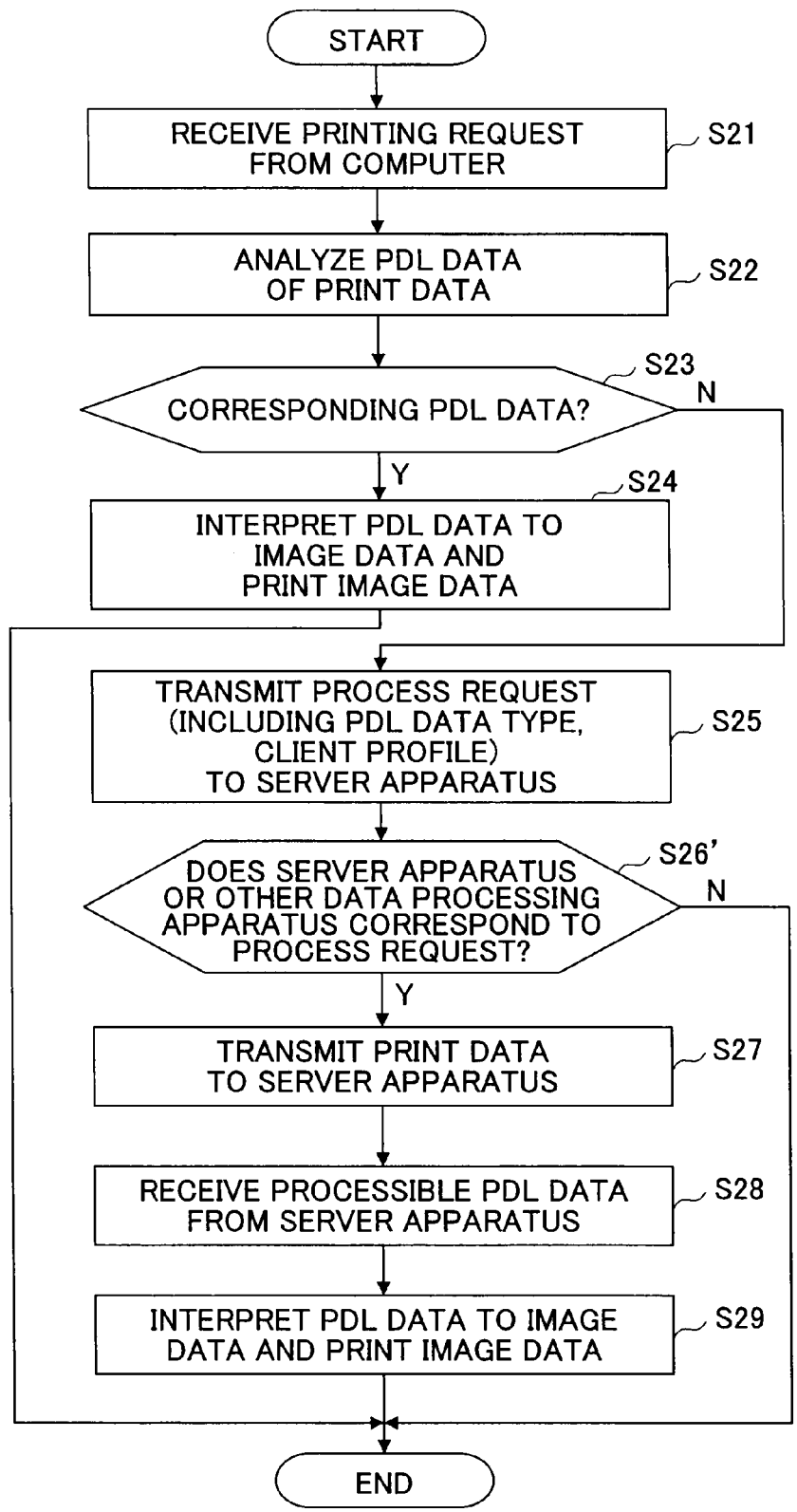
FIG. 14 is a flowchart showing a fourth example of operation controls performed in a case where a printer apparatus in a data processing system shown in FIG. 2 receives a printing request from a computer in a network according to an embodiment of the present invention.

FIG. 14 is a flowchart showing a fourth example of operation controls performed in a case where the printer apparatus 202 in the data processing system 2000 shown in FIG. 2 receives a printing request from the computer 101 in the network 104.

The printer apparatus 202 performs the operation controls described in Steps S21 through S25 of FIG. 14 in the same manner as Steps S21 through S25 described of FIG. 11 of the fourth embodiment of the present invention. Then, in Step S26' of FIG. 14, the printer apparatus 202, in response to a process request transmitted to the server apparatus 201, receives a report indicating whether PDL data indicated in the process request can be processed by the server apparatus 201 or the printer apparatus 203. In a case where the PDL data cannot be processed by the server apparatus 201 and the printer apparatus 203 (No in Step 26'), the operation shown in FIG. 14 is terminated. In a case where the PDL data can be processed by either the server apparatus 201 or the printer apparatus 203 (i.e. a case where the response from the server apparatus 201 or the printer apparatus 203 is a data request), the printer apparatus 202 performs Steps S27 through S29 in the same manner as the fourth embodiment.

FIG. 15 is a flowchart showing a second example of operation controls performed in a case where the server apparatus 102 in the data processing system 2000 shown in FIG. 2 receives a process request from a client apparatus (in this case, the printer apparatus 202) in the network 104.

The server apparatus 201 performs operation controls in Step S31 through S36 of FIG. 15 in the same manner as Steps 31 through S36 of FIG. 9 of the second embodiment. It is, however, to be noted that the client apparatus in this example is the printer apparatus 202.

In a case where the server apparatus 201 determines that it (server apparatus 201) does not have the function of converting PDL data of the print data to another PDL data type that can be processed by the printer apparatus 202 (No in Step 32), the server apparatus 201 transmits the process request received from the client apparatus (in this case, the printer apparatus 202) to another data processing apparatus (in this case, the printer apparatus 203) in Step S71. Then, in Step S72, the server apparatus 201 receives a response from the printer apparatus 203 indicating whether the printer apparatus 203 can fulfill the process request (i.e. convert the PDL data of the print data to another PDL data type that can be processed by the printer apparatus 202). In a case where the printer apparatus 203 cannot fulfill the process request (a case where the response from the printer apparatus 203 is a process inability report) (No in Step S72), the inability to process the print data is reported to the printer apparatus 202 (Step S77). Thereby, when the process inability is reported, the operation shown in FIG. 15 is terminated.

In a case where the printer apparatus 203 can fulfill the process request (a case where the response from the printer apparatus 203 is a data request) (Yes in Step S72), the server apparatus 201 transmits a data request to the printer apparatus 202 for requesting the printer apparatus 202 to transmit the print data (Step S73). When the server apparatus 201 receives the print data transmitted from the printer apparatus 202 in response to the data request (Step S74), the server apparatus 201 transmits the print data to the printer apparatus 203 (Step S75). Then, the server apparatus 201 successively receives PDL data that can be processed (processible data) by the printer apparatus 202 from the printer apparatus 203, and successively transmits the received data to the printer apparatus 202 (Step S76).

When the printer apparatus 203 receives a process request from a client apparatus (server apparatus 201), the same operation controls as those of the FIG. 9 are performed.

With the above-described sixth embodiment of the data processing system 2000 including the printer apparatus 202 configured to conduct the operation control shown in FIG. 14, the server apparatus 201 configured to conduct the operation control shown in FIG. 15, and the printer apparatus 203 configured to conduct the operation control shown in FIG. 9, a function which cannot be realized by a printer apparatus 202 alone can be realized by the data processing system 2000 by having the printer apparatus 202 transmit data regarding PDL data that can be processed by the printer apparatus 202 (processible data) and PDL data of the print data to the server apparatus 201 or the printer apparatus 203 and having the server apparatus 201 or the printer apparatus 203 perform a process based on the transmitted data. Furthermore, since the conversion from one type of PDL data to another type of PDL data is performed by the server apparatus 201 or the printer apparatus 203, the driver function of the computer 101 used for providing print data to the printer apparatus 202 is not limited by the printer apparatus 202.

It is to be noted that a server apparatus is not necessarily required where there are plural printer apparatuses. However, in a case where there is a server apparatus along with plural printer apparatuses (i.e. plural printer apparatuses connected to a server apparatus) as shown in FIG. 2, by registering (storing) the functions (types of processible data) of each printer apparatus in the server apparatus beforehand, a client apparatus can determine the functions (types of processible data) of a desired printer apparatus by simply querying the server apparatus. This is significantly efficient compared to ascertaining whether certain data can be processed by each of the printer apparatuses. The server apparatus can store data of the functions (types of processible data) of each printer apparatus and provide data of the functions (types of processible data) of each printer apparatus.

Furthermore, in the data processing system 3000 shown in FIG. 3 according to the third embodiment of the present invention, the scanner apparatus 302 acts as an input apparatus (e.g., computer), and a printer apparatus 303 is designated as the printer to perform a printing process (printing destination) by the user. The scanner apparatus 302 transmits data of itself (scanner apparatus 302) and process data (profile) of the printer apparatus (printing destination) 303 to the server apparatus 301. After a corresponding process is performed by the scanner apparatus 302, the server apparatus 301 transmits the processed data to the printer apparatus 303. Thereby, the server apparatus 301 can perform a suitable image correcting process based on image characteristic data (e.g., γ characteristics) corresponding to the function (e.g., image processing function) of the scanner apparatus 302 and the printer apparatus 303, respectively. Accordingly, high quality images can be printed without having to prepare a specific image process for the printer apparatus 303 and the scanner apparatus 302.

With the above-described embodiments of the present invention, a system consisting of a group of data processing apparatuses having various functions can provide functions that cannot be achieved by a data processing apparatus alone.

The present invention is not limited to the specifically disclosed embodiments, and variations and modifications may be made without departing from the scope of the present invention.

The present application is based on Japanese Priority Application No. 2007-149545 filed on Jun. 5, 2007 with the Japanese Patent Office, the entire contents of which are hereby incorporated herein by reference.

What is claimed is:

1. A data processing system having a client apparatus for requesting target data to be processed and a server apparatus for performing a process on the target data transmitted from the client apparatus, the data processing system comprising:
   a client process request transmitting part provided in the client apparatus and configured to transmit a process request and processible data indicating data that can be processed by the client apparatus to the server apparatus; and
   a processing part provided in the server apparatus and configured to perform a suitable process on the target data based on the processible data transmitted together with the process request from the client process request transmitting part,
   wherein the client apparatus includes a printer apparatus having a memory for storing print data in the form of image data and configured to print the stored image data onto a recording medium,
   wherein the client process request transmitting part is configured to transmit the process request together with type data of the print data and memory size data included in the processible data to the server apparatus and transmit the print data to the server apparatus after transmitting the process request,
   wherein the server apparatus further includes
      a data converting part configured to convert print data to image data,
      a data conversion determining part configured to determine whether the print data can be converted to image data by the data converting part according to the type data of the print data and the memory size data transmitted from the data client process request transmitting part,
      a conversion instructing part configured to instruct the data converting part to convert the print data to image data when the data conversion determining part determines that the print data can be converted to image data, and
      an image dividing/transmitting part configured to divide the image data converted by the data converting part when the size of the converted image data is greater than the size of the memory and transmit the divided image data to the client apparatus.

2. The data processing system as claimed in claim 1, wherein the client apparatus further includes a client data converting part configured to convert print data to image data,
   wherein when the client apparatus receives print data that cannot be processed by the client data converting part, the client process request transmitting part is configured to transmit the process request together with the type data of the print data and the memory size data to the server apparatus and transmit the received print data to the server apparatus after transmitting the process request.

3. The data processing system as claimed in claim 2, further comprising:
   a data processing apparatus having a same function as the server apparatus;
   wherein the server apparatus further includes
      a data requesting part for transmitting a data request to the client apparatus when the data conversion determining part determines that the print data can be converted to image data by the data converting part, and
      a process inability reporting part for transmitting a process inability report to the client apparatus when the data conversion determining part determines that the print data cannot be converted to image data by the data converting part,
   wherein the client process request transmitting part is configured to transmit the print data to the server apparatus when receiving the data request and transmit the process request together with the processible data to the data processing apparatus.

4. The data processing system as claimed in claim 2, further comprising:
   a data processing apparatus having a same function as the server apparatus;
   wherein the server apparatus further includes
      a server process request transmitting part configured to transmit the print data received from the client apparatus to the data processing apparatus after transmitting the process request together with the processible data to the data processing apparatus and to transmit the received print data to the data processing apparatus after transmitting the process request in a case where the data conversion determining part determines that the print data cannot be converted to image data by the data converting part.

5. A data processing system having a client apparatus for requesting target data to be processed and a server apparatus for performing a process on the target data transmitted from the client apparatus, the data processing system comprising:

a client process request transmitting part provided in the client apparatus and configured to transmit a process request and processible data indicating data that can be processed by the client apparatus to the server apparatus; and a processing part provided in the server apparatus and configured to perform a suitable process on the target data based on the processible data transmitted together with the process request from the client process request transmitting part, wherein the client apparatus includes a printer apparatus having a memory for storing print data in the form of image data and configured to print the stored image data onto a recording medium, wherein the client process request transmitting part is configured to transmit the process request together with type data of the print data and processible data-type data included in the processible data to the server apparatus and transmit the print data to the server apparatus after transmitting the process request, wherein the server apparatus further includes
a data converting part configured to convert print data to another type of print data that can be processed by the client apparatus,
a data conversion determining part configured to determine whether the print data can be converted to the other type of print data by the data converting part according to the type data and the processible data-type data transmitted from the client process request transmitting part,
a conversion instructing part configured to instruct the data converting part to convert the print data to the other type of print data when the data conversion determining part determines that the print data can be converted to the other type of print data, and
a print data transmitting part configured to transmit the converted other type of print data to the client apparatus.

6. The data processing system as claimed in claim 5, wherein the client apparatus further includes a client data converting part for converting print data to image data, wherein when the client apparatus receives print data that cannot be processed by the client data converting part, the client process request transmitting part is configured to transmit the process request together with the type data of the print data and the processible data-type data to the server apparatus and transmit the received print data to the server apparatus after transmitting the process request.

7. A data processing apparatus being part of a plurality of data processing apparatuses for processing target data, the data processing apparatus comprising:

a client process request receiving part provided for receiving a process request and processible data indicating data that can be processed by the data processing apparatus from a client apparatus, the client apparatus including a printer apparatus having a memory for storing print data in the form of image data and configured to print the stored image data onto a recording medium, the client process request receiving part further receives the process request together with type data of the print data and memory size data included in the processible data from the client apparatus and receives the print data from the client apparatus after receiving the process request;

a processing part for performing a suitable process on the target data based on the processible data received together with the process request from the client process request receiving part;

a data converting part for converting print data to image data;

a data conversion determining part configured to determine whether the print data can be converted to image data by the data converting part according to the type data of the print data and the memory size data received by the client process request receiving part;

a conversion instructing part for instructing the data converting part to convert the print data to image data when the data conversion determining part determines that the print data can be converted to image data; and an image dividing/transmitting part configured to divide the image data converted by the data converting part when the size of the converted image data is greater than the size of the memory and transmit the divided image data to the client apparatus.

8. The data processing apparatus as claimed in claim 7, further comprising:

a connecting part for connecting the data processing apparatus to a server apparatus, the server apparatus including,
a data storing part for storing data of the processing part of the data processing apparatus; and
a data displaying part for displaying the data of the processing part of the data processing apparatus to the client apparatus.

9. The data processing apparatus as claimed in claim 8, wherein the server apparatus further includes, a server processing part for performing a suitable process on the target data based on the data of the processing part of the data processing apparatus in a case where the data processing apparatus requests another one of the plural data processing apparatuses to process the target data.

* * * * *